May 14, 1940.   J. J. ZOTTER   2,201,019
FUEL CONSUMPTION TESTER
Filed Dec. 17, 1938   2 Sheets-Sheet 1
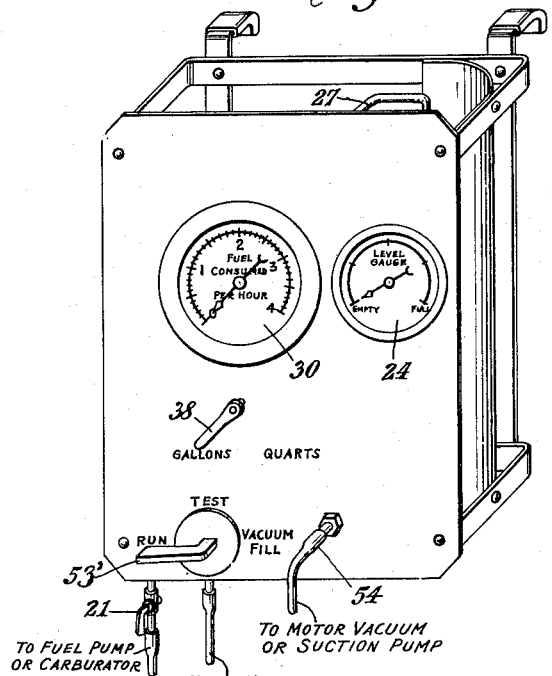
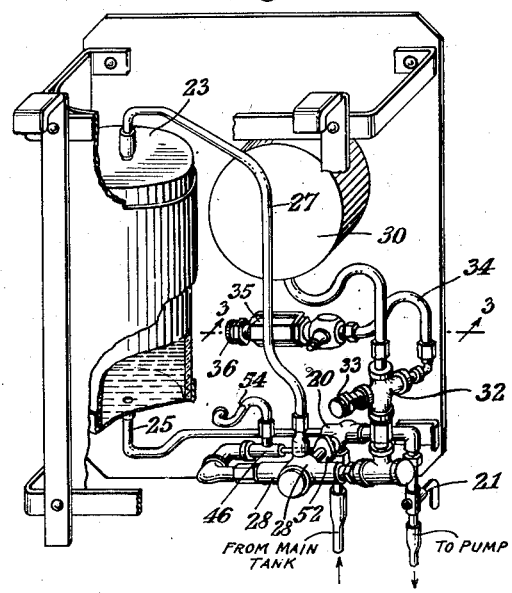
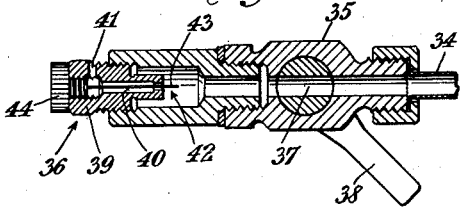
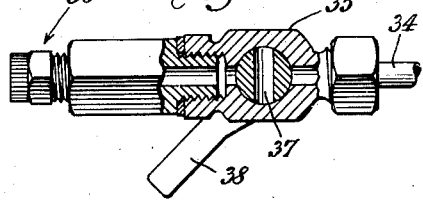
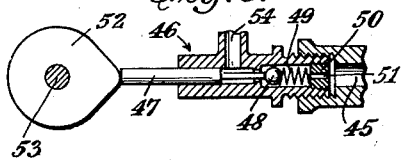
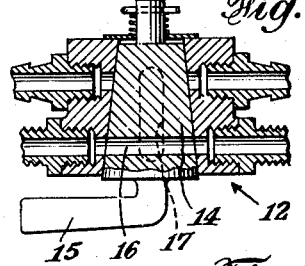
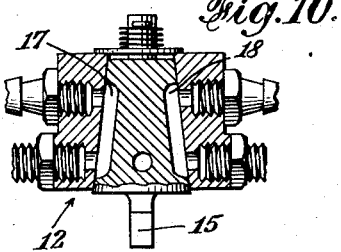
INVENTOR
John J. Zotter
BY
his ATTORNEY

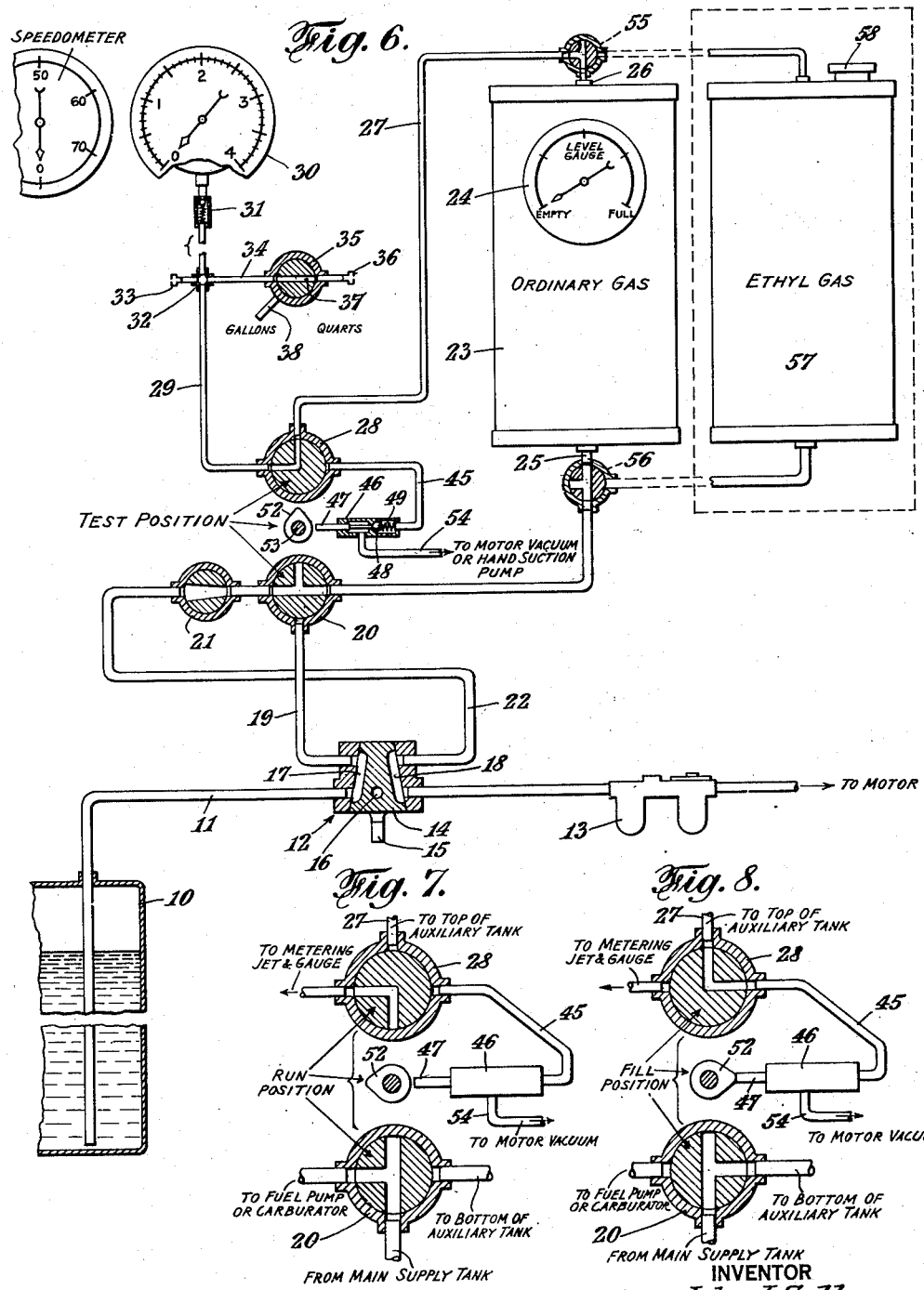

Patented May 14, 1940

2,201,019

UNITED STATES PATENT OFFICE 2,201,019

FUEL CONSUMPTION TESTER

John J. Zotter, Brooklyn, N. Y.

Application December 17, 1938, Serial No. 246,283

2 Claims. (Cl. 73—51)

This invention relates to testing devices in general, and particularly to apparatus of the general character indicated for determining the consumption of fuel at various speeds of a motor vehicle or any machinery utilizing an internal combustion engine.

One of the objects of the present invention is to provide a device of this kind whereby the consumption of fuel may be tested at different sea levels, and wherein the amount of consumption may be immediately ascertained from a direct reading indicator or gage, and compared simultaneously with the speed of the vehicle, or with the R. P. M. of the engine.

Another object of this invention is to provide a device of the afore-mentioned type wherein the consumption of fuel may be read directly in either one or more measuring units, for example in gallons or in quarts.

Another object of this invention is to provide a system of controls for governing the operation of the device for periods of testing, for periods of normally running the vehicle without testing its consumption, and for preparing the device for a test period.

A still further object of this invention is the provision of a device capable of fulfilling the hereinbefore mentioned objects which may be permanently or temporarily associated with the engine to be tested and which is simple in construction, easy and economical to fabricate and assemble and admirably adapted to perform the intended functions.

The foregoing and still further objects and advantages of this invention will become more fully apparent from the ensuing description in connection with the accompanying drawings, forming part of my disclosure, which drawings, however, are by no means intended to limit me to the actual construction and arrangement shown, and in which Fig. 1 is a perspective front view of my testing device.

Fig. 2 is a perspective rear view thereof with a portion broken away and exposing the different control arrangements.

Fig. 3 illustrates a controlled metering air inlet employed in my device, shown in longitudinal section, wherein the control valve thereof is in one position.

Fig. 4 shows the same metering air inlet in partial longitudinal section with its control valve in another position.

Fig. 5 is a longitudinal section of a vacuum control valve employed in my device.

Fig. 6 illustrates a diagrammatical arrangement of my device.

Figs. 7 and 8 illustrate diagrammatically two different positions of the control valves employed in my device.

Fig. 9 is a detail cross sectional view of an auxiliary valve, placed in the fuel supply line, for facilitating the attachment and removal of a fuel consumption testing device, Fig. 10 is a similar view of the same valve, with the valve cone shown in another position.

Referring now specifically to Fig. 6, numeral 10 denotes a main fuel supply tank from which leads a suction line 11 through auxiliary control valve 12 to the pump or other suction device indicated at 13 such as is customarily associated with internal combustion engines. The employment of valve 12 is optional, since it is not actually required and does not form a part of my testing device, but its installation in the fuel supply line is of an advantage when frequent engine tests are to be made from time to time. I shall, therefore, include this valve as an auxiliary part of my testing system.

Valve 12 consists of an operable cone body 14, which may be turned to two positions by means of a handle 15, and which cone body is provided with a passage 16 for directly connecting tank 10 with pump 13, and two channels 17 and 18 for directing the passage of fuel from tank 10 through conduit 19, control valve 20, throttle valve 21, and conduit 22 to pump 13, in which case fuel control valve 20 will be in the position indicated in the lower part of Fig. 7, as will be described in greater detail later on.

For obtaining quick, accurate and sensitive readings in my device I preferably employ a substantially completely sealed test container 23 of a relatively limited capacity. This container may be made of either transparent material or, when made of opaque material may be provided with a transparent liquid gage or a level indicator, such as shown at 24, for ascertaining the test fuel contents therein. From the bottom of the container leads a conduit 25 to control valve 20, and from there through throttle valve 21, conduit 22, and channel 18 of auxiliary valve 12 to pump 13.

At the top of container 23 there is secured at 26 a conduit 27, leading through gage control valve 28 and conduit 29 to vacuum gage 30. Just below the vacuum gage I provide a safety valve 31, which will automatically close against the vacuum gage when pressure should develop within the system. Valve 31, however, does not prevent the operation of the vacuum gage under partial vacuum.

Connected with conduit 29 by means of cross fitting 32 there is provided a permanently open metering air inlet, indicated at 33 in Figs. 2 and 6, of a construction similar to that illustrated in detail in Fig. 3. Connected also with conduit 29 is a short conduit 34 leading to valve 35, with which is associated another metering air inlet 36, shown in Figs. 2, 3, 4, and 6. Valve 35 contains a turnable valve core which is provided with passage 37, and which valve core may be operated by means of lever 38. When this lever is in the position shown in Figs. 1, 3, and 6, both metering air inlets 33 and 36 permit the entrance of air into the system. When lever 38 is switched to the "quarts" position, only air inlet 33 functions.

The metering air inlets are preferably constructed in the manner shown in Fig. 3. They consist of a removable body 39 provided with a central air passage 40, with which is connected an air inlet 41. The interior end of passage 40 terminates in a small air opening 42, into which projects a pin 43 attached to a screw 4, which is removably secured in body 39. By changing the diameter of pin 43, the capacity of inlet 42 may be readily altered.

Connected by means of conduit 45 to gage control valve 28 is a vacuum control valve 46, shown in detail in Fig. 5. This valve is provided with a plunger 47 which bears against ball valve 48. The latter is constantly urged to closing position by means of spring 49. This spring is seated against a plug 50, provided with a small opening 51. Through the operation of spring 49, plunger 47 is normally urged outwards. Since ball 48 is normally pressed against its valve seat, it will close the passage to conduit 45 and will only open that passage when plunger 47 is pushed inwards. The operation of the plunger is accomplished by a cam 52 which is secured to shaft 53, which shaft connects the operative cores of valves 20 and 28. In this manner these two valves and cam 52 are simultaneously operated by a handle 53', illustrated in Fig. 1. Vacuum control valve 46 is provided with a conduit 54 leading to either the intake manifold of the motor, or may be connected to a hand suction pump if the motor is not running.

Different settings of control valves

*Fill position.*—Before a test is run it is necessary to fill auxiliary container 23 with fuel. This is accomplished by setting control lever 53' to a position marked "vacuum fill" in Fig. 1. In this position fuel control valve 20 is so set that it will connect the main supply tank 10 with the bottom of the auxiliary or testing tank 23, as clearly indicated in Fig. 8. At the same time gage control valve 28 will be set so that conduit 27, leading to the top of the auxiliary tank, will be connected through vacuum control valve 46 to the vacuum or suction of the motor. In this position of valves 20 and 28, cam 52 will push plunger 47 inwards, whereby ball valve 48 will leave its seat and permit the suction of the motor or of a suction pump to draw the fuel into the auxiliary or test container.

*Test position.*—When a test is to be run, control lever 53' is turned to position marked "test." At this instance the settings of valves 20 and 28 and of cam 52 are illustrated in Fig. 6. Valve 20 is in such a position as to connect the bottom of auxiliary tank 23 with pump 13, while main tank 10 is cut out. At the same time valve 28 will connect vacuum gage 30 with the top of auxiliary tank 23. Simultaneously, cam 52 is in such a position as to free plunger 47, so that ball 48 will close the passage of vacuum control valve 46.

*Normal run position.*—When it is desired to operate the motor under ordinary conditions, control lever 53' is set to the position shown in Fig. 1, marked "run." The setting of the valves and cam 52 is shown in Fig. 7. Valve 20 is set to connect with fuel tank 10, cutting out auxiliary or testing tank 23, and connecting through throttle valve 21 to fuel pump 13. Valve 28 is so positioned that it will cut out the connection to the top of auxiliary tank 23 and also shut off the connection to vacuum gage 30. Cam 52 is in disengaging position in respect to plunger 47. For normally running the motor, while the test device is still connected, auxiliary control valve 12 will remain in the position indicated in Figs. 6 and 10. When my testing instrument is to be removed, handle 15 of auxiliary control valve 12 is turned so that passage 16 connects fuel tank 10 directly with pump 13 in the manner illustrated in Fig. 9. In this case the unused connections of valve 12 are preferably closed by plugs.

During test runs of different sizes of motors the consumption of fuel may greatly vary. Larger motors have larger fuel consumption, while smaller motors have smaller fuel consumption. By the same token, test runs may be made for idling periods, during which the consumption of fuel will be very small. In order to provide accurate readings, I employ the arrangement controlled by valve 35, whereby either a reading in gallons or a reading in quarts may be had by simply switching lever 38 to the "gallons" or "quarts" position. When in the gallon reading position, both air inlets 33 and 36 will permit air to pass into conduit 29; while in the "quarts" reading position only air inlet 33 will remain open, so that a much smaller air intake will take place. Gage 30 will indicate either quart or gallon readings, depending upon the setting of valve 35.

During tests I preferably place gage 30 in near proximity to the existing speedometer of the vehicle, indicated next to gage 30 in Fig. 6, for which purpose the connection to gage 30 is so arranged as to render the gage removable from my testing device, by the use, for instance, of flexible tubing.

In order to permit the carrying out of tests with different types of fuels, I provide at the top and the bottom of test container 23 suitable valves 55 and 56, shown in Fig. 6, which valves are connected with another auxiliary tank 57. The latter is preferably equipped with a filling inlet 58. When it is desired to run a test with another fuel from tank 57, valves 55 and 56 are so set as to cut out auxiliary tank 23 and connect auxiliary tank 57.

Operation

In determining the sizes of the air-inlets of the metered members 33 and 36, fuel is withdrawn from the bottom of the tank 23 at a predetermined rate and the air-inlets 33 and 36 are adjusted until the reading on the scale of the gage 30 corresponds with said predetermined rate of withdrawal. The inlets are then fixed at that point. Of course, if the device is to be used at an altitude relative to sea level, which is different from that at which the adjustments were made, the metered air-inlets have to be reset.

For a test run all parts are set in accordance with the illustration shown in Fig. 6, with the exception that valve 35, controlling the reading in gallons or quarts, may be set to either of the two positions. Similarly, throttle valve 21 may be adjusted so as to provide just a sufficient supply of fuel for properly operating the motor to be tested.

As pump 13 draws fuel from auxiliary tank 23 to the carbureter of the motor, a partial vacuum will be created in the upper portion of tank 23 as a limited air intake takes place through air inlet 33, or air inlets 33 and 36. This partial vacuum is directly registered on gage 30 from which the consumption in either gallons or quarts may be directly read. The gage reading is then checked against the reading of the speedometer, from which double readings the consumption of fuel at given speeds of the vehicle is directly determined.

From the foregoing it will be readily evident that I provide a testing device whereby the consumption of fuel of a motor may be ascertained directly from the readings on gage 30, irrespective of the quantity of fuel contained in auxiliary tanks 23 or 57. At the same time the consumption of fuel may be directly compared with the speed of a vehicle by placing either the entire instrument or the gage within reading distance of the speedometer.

Another important advantage of my device resides in the fact that accurate readings can be made instantaneously, that is to say, the moment the motor is operated. It is, therefore, not necessary to first operate the vehicle for any length of time prior to the actual test in order to prepare for such test, but on the contrary, the test readings may be made immediately and at any moment during, and from the very start of operation of the motor.

By changing the capacities of the metered air inlets 33 and 36, and by employing a vacuum gage corresponding to the changed capacities of the inlets, the amount of vacuum created in the test tank may be altered. Thus if the motor to be tested is of such dimension that it requires readings of either fractions of quarts or readings greater than gallons, it is a simple matter to adapt my tester for any desired capacities.

A rather important part of my testing instrument is throttle valve 21, by means of which the fuel supply may be so controlled that only the actually needed quantity of fuel is passed into the motor to be tested to assure its required speed and proper operation.

My testing device may be installed permanently in a vehicle, although it is shown to be portable and is equipped with a casing or frame which is provided with means for suspending it wherever desired. Thus it may be readily installed or removed without difficulty. When first installing my tester in a motor vehicle, it is necessary to break the fuel line. Usually it becomes essential to run tests periodically. This would require the breaking and re-connecting of the fuel line, which entails considerable labor. To avoid this I prefer to permanently install my auxiliary control valve 12.

It is to be noted that my testing device is equipped with a relatively small, substantially sealed test tank for the purpose of creating quickly a partial vacuum therein at the slightest withdrawal of the fuel from the tank. In other words, it is essential that my device is sufficiently sensitive to react to the slightest partial vacuum formation created in the system and instantaneously register such partial vacuum formation on the vacuum gage. This indicates that my testing device will not work accurately unless a substantially sealed test tank of a limited capacity is employed. In other words, it is evident that it would be impossible to run an accurate test by using the main fuel supply tank of a vehicle.

While I have shown specific arrangements of my device, it is obvious that changes and improvements may be incorporated therein, and I therefore reserve for myself the right to make such changes and improvements, without departing from the broad scope of the annexed claims.

I claim:

1. A portable fuel testing device for internal combustion engines, comprising, a tank; a pair of three-way valves; a vacuum gage provided with at least one metered air-inlet; conduits connecting one of said valves with one end of said tank, said vacuum gage and a source of suction; additional conduits connecting the other of said valves with the other end of said tank, the fuel pump of the engine to be tested, and a main source of fuel supply; and means to simultaneously operate said three-way valves whereby, in their first position, said tank, said vacuum gage and said source of suction are cut off from each other and connection is established between the main source of fuel supply and the fuel pump of the engine to permit the normal operation of the engine; in their last position, said first named end of said tank is connected with the source of suction, and said vacuum gage and the fuel pump of the engine are cut out of the system, and said second named end of said tank is connected with the main source of fuel supply whereby operation of the source of suction draws fuel from the main source of supply into said tank; and, in their intermediate position, said first named end of said tank is connected with said vacuum gage, said second named end of said tank is connected with the fuel pump of the engine, and said source of suction and said main source of fuel supply are cut out of the system whereby, upon operation of the engine, the rate of withdrawal of fuel from said tank is indicated on said vacuum gage.

2. A portable fuel testing device for internal combustion engines, comprising, a tank; a pair of connection controlling means; a vacuum gage provided with at least-one metered air-inlet; conduits connecting one of said means with one end of said tank, said vacuum gage and a source of suction; additional conduits connecting the other of said means with the other end of said tank, the fuel pump of the engine to be tested, and a main source of fuel supply; and means to simultaneously operate said connection controlling means whereby, in their first position, said tank, said vacuum gage and said source of suction are cut off from each other and connection is established between the main source of fuel supply and the fuel pump of the engine to permit the normal operation of the engine; in their last position, said first named end of said tank is connected with the source of suction, and said vacuum gage and the fuel pump of the engine are cut out of the system, and said second named end of said tank is connected with the main source of fuel supply whereby operation of the source of suction draws fuel from the main source of supply into said tank; and, in their intermediate position, said first named end of said tank is connected with said vacuum gage, said second named end of said tank is connected with the fuel pump of the engine, and said source of suction and said main source of fuel supply are cut out of the system whereby, upon operation of the engine, the rate of withdrawal of fuel from said tank is indicated on said vacuum gage.

JOHN J. ZOTTER.